United States Patent Office 3,329,490
Patented July 4, 1967

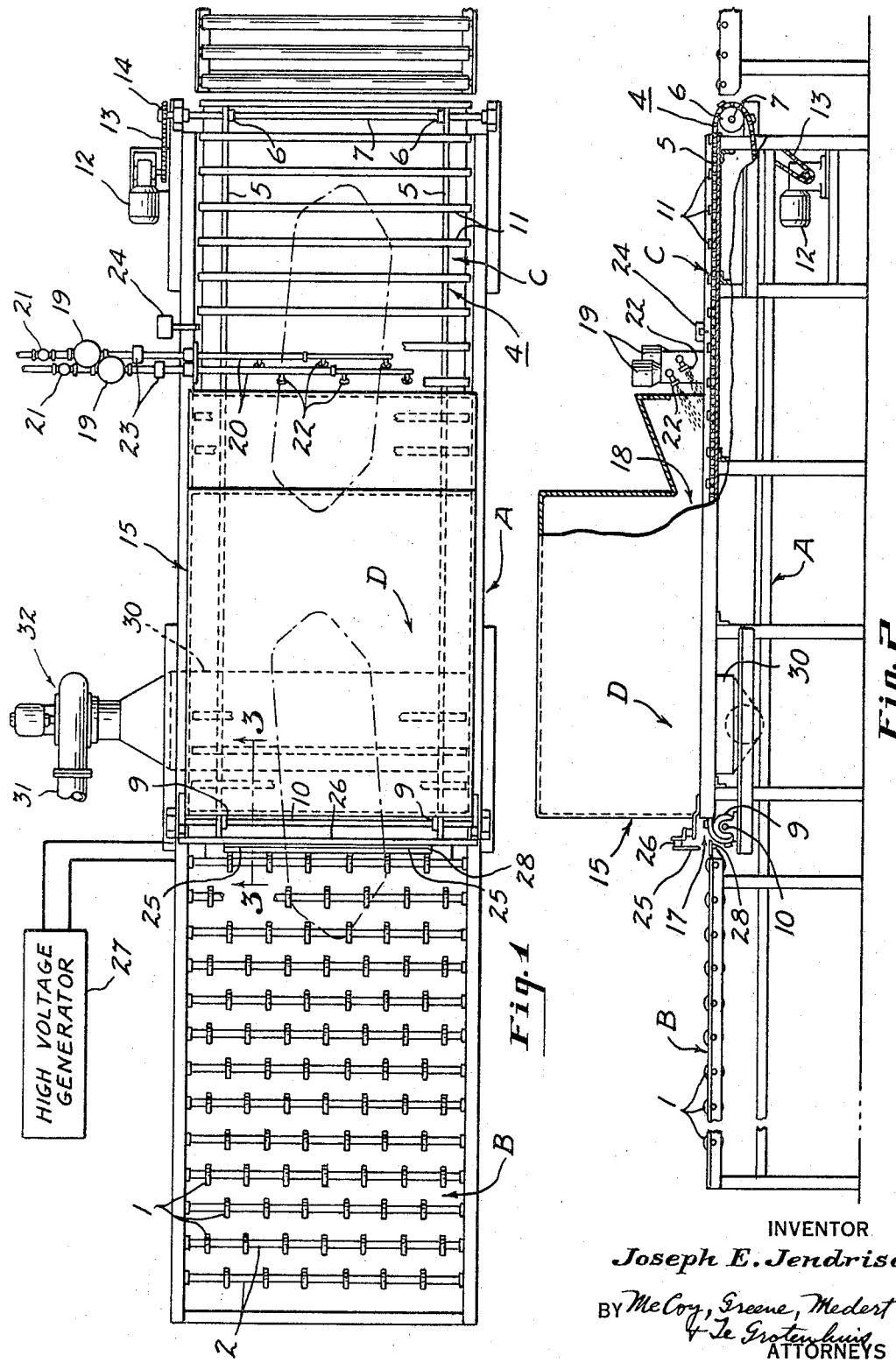

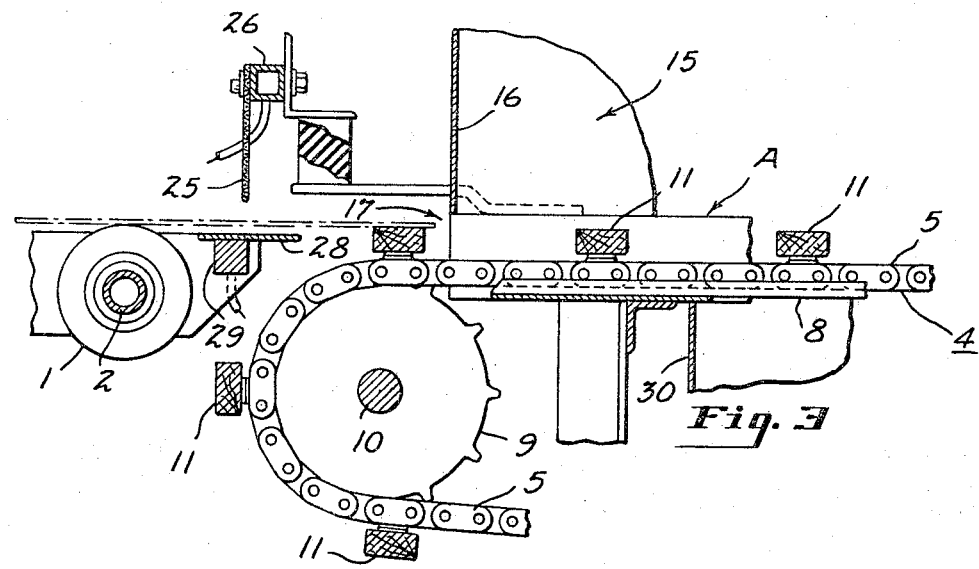
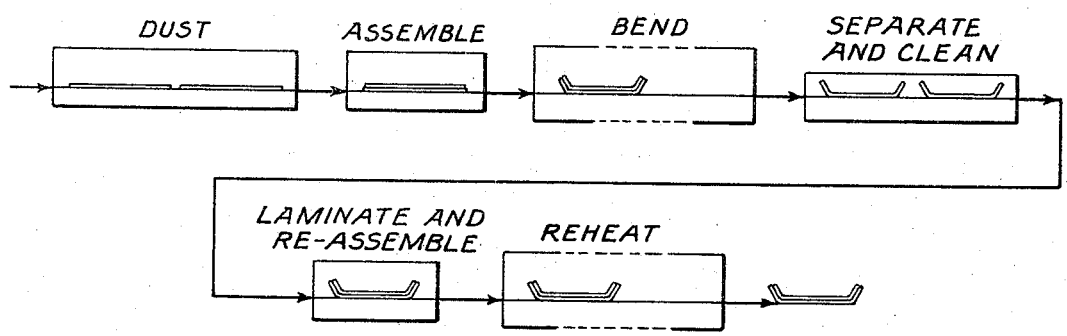
Fig. 4

3,329,490
ELECTROSTATIC DEPOSITION OF PARTING MATERIALS IN METHOD OF BENDING SUPERPOSED GLASS SHEETS
Joseph E. Jendrisak, Northville, Mich., assignor to Shatterproof Glass Corporation, Wayne County, Mich., a corporation of Delaware
Filed Sept. 16, 1963, Ser. No. 309,251
6 Claims. (Cl. 65—26)

The present invention relates to the manufacture of laminated safety glass including at least two sheets of glass with a thin layer of transparent thermo-plastic material interposed between and adhered to the glass sheets, and more particularly, to a method of bending superposed glass sheets by the application of heat, and thereafter assembling a laminated product by adhering the adjacent surfaces of the glass sheets to an interposed thermoplastic layer.

In the production of bent, laminated safety glass, it is customary to bend the glass sheets to be laminated in superposed relation and to keep the sheets from being bound together by fusion during the bending by the interposing between the contiguous faces of the sheets a relatively thin coating of a suitable inorganic "parting" material. Various water-insoluble, finely-divided materials, such as calcium carbonate and powdered mica, may be used, but are objectionable because of the great difficulty of completely removing them from the glass surfaces after the bending operation. Various water-soluble salts such as sodium bicarbonate, sodium potassium, and magnesium sulfate have been used with some success. The superposed sheets of glass are then heat-softened until they lose their rigidity and sag into a desired shape on a mold. Bending temperatures of from 1160° F. to 1200° F. are commonly required to soften the glass sufficiently to obtain close conformity between the superposed sheets of glass.

The water-soluble "parting" materials have been applied by spraying the glass sheets with an aqueous solution and drying, or by spraying the glass sheets with a suspension of the water-soluble salt in a highly volatile liquid such as methyl or ethyl alcohol in which the salt is not soluble.

The sheets of glass which have been sprayed with a solution or suspension must be dried before being assembled on the bending molds. Drying of sheets coated with an aqueous solution requires application of heat to remove the excess water. While the volatile liquids used for suspending the salt particles may evaporate without application of heat, complicated and expensive apparatus is required to prevent contamination of the atmosphere and for recovery of the solvents. Since both the anhydrous salts and the anhydrous solvents are highly hygroscopic, the dried coating applied either as an aqueous solution or as a suspension in a volatile liquid contains an undesirable amount of water.

In the bending of glass sheets for the production of curved laminated panes such as employed for automobile windshields it has never been found possible to entirely eliminate losses due to imperfect matching of the curved sheets which resulted in a defective product and due to breakage in the bending lehr. Various expedients have been found to lessen these losses but have not eliminated them. In his study of the problem, applicant considered the possibility that the "parting" materials commonly employed may have been responsible to a substantial degree for both the defective matching of the sheets and breakage of glass in the bending lehr. Applicant's theories as to how the "parting" materials may have contributed to the defective matching and glass breakage led to the development of the method of the present invention which has been found effective to substantially lessen the losses due to mismatching and glass breakage.

After the sprayed coating is dried it is tightly adhered to the surface of the glass and forms a layer of relatively immobile particles. It is applicant's belief that when the layers of the "parting" material adhered to the glass by concentrated solution of the "parting" material engage one another, the immobile particles in the coatings interlock and actually hinder relative sliding movements of the glass sheets with the result that perfect matching or conformity of the contiguous glass faces is often prevented.

It is also applicant's belief that, when a "parting" material was applied to the glass in a solution or in a suspension as above described, the dried material would retain an undesirable amount of water after drying and that this would account for some of the breakage in a bending oven. Applicant's theory appeared to be supported by the fact that losses due to glass breakage were increased during periods of high humidity.

The intent of the present invention is to provide a "parting" material that is of a character such that resistance to sliding of the sheets of glass one upon the other during the bending operation is lessened and to apply this material in such a way that the amount of moisture between the sheets is reduced to a minimum. It has been found that these improved results may be obtained by the application of a "parting" agent, such as sodium, potassium, or magnesium sulfate, dehydrated to eliminate a major portion of the water content and by applying the "parting" agent in finely-divided dry powder form rather than in the form of a liquid spray. According to the present invention, the "parting" material is first dehydrated and then milled to a finely-divided particle form.

Magnesium sulphate is preferred to the other salts above mentioned because it is available in large quantities at a low price in the form of Epsom salts $MgSO_4 \cdot 7H_2O$ and because when dehydrated has a considerably higher melting point. Also, when dehydrated it can be ground in a ball mill to a powder, the individual particles of the powder being of approximately spherical form.

The fine dry powder is so applied to the surface of the glass as to provide a coating of loose, finely-divided powder which does not strongly adhere to the surface of the glass, and which does not hinder relative movement of the glass sheets when they are superposed. In fact, the finely-divided particles appear to provide a form of lubrication that actually assist in the sliding of the glass sheets relative to one another during the bending operation, so that bending speeds are increased significantly. It is essential that the "parting" material be in the form of a fine powder and it is preferred that it be of from 400 to 500 mesh according to the Tyler standard screen size series.

After the glass has been heat-softened and bent to proper form in a glass bending lehr, the sheets are separated and the "parting" material may easily be removed by spraying the surfaces with water or other suitable liquid to remove the water-soluble material.

While the dust may be applied to the glass in many ways, one very desirable method is to electrostatically charge the top surface of the glass sheets and thus create a charge differential between the glass surface and the fine particles of the "parting" material suspended in air flowing over the glass sheet that will cause the particles to move into engagement with and cling to the glass surface.

It is among the objects of the present invention to provide a method of making bent laminated safety glass by heat-softening superposed sheets of glass in a mold, wherein the adjoining surfaces of the glass sheets are lubricated to facilitate relative movement thereof during the bending process.

It is a further object of the present invention to provide a means for applying a relatively moisture-free "parting" material to the surfaces of glass sheets to be superposed and heat-softened for bending, wherein the "parting" material facilitates relative movement of the glass sheets and may later be dissolved and removed from the surfaces of the glass by a liquid spray.

It is also an object of the present invention to provide a "parting" material for use in bending superposed sheets of glass by heat-softening, which "parting" material is relatively moisture-free, soluble in water, and in a finely-divided powder form suitable for application by dusting.

It is also an object of the present invention to provide an electrostatic means for applying a "parting" material to the surface of glass sheets to be superposed and heat-softened for bending, wherein the finely-divided particles of a water-soluble "parting" material are attracted to and uniformly deposited over the negatively charged surface of a sheet of glass.

Other objects and advantages of the present invention will be apparent from the accompanying drawings forming a part of this specification, and wherein:

FIGURE 1 is a plan view of an apparatus for electrostatically applying a "parting" material in the form of a dust to the surface of glass sheets;

FIGURE 2 is a side elevation with parts broken away of the apparatus shown in FIGURE 1;

FIGURE 3 is a fragmentary sectional view taken on the line 3—3 of FIGURE 1 showing the arrangement for inducing a negative charge on the surface of the glass; and FIGURE 4 is a flow diagram showing the steps included in the process of the present invention.

Referring more particularly to the drawings, there is shown an apparatus for applying a finely-divided "parting" material in dust form to the surfaces of glass sheets electrostatically, prior to the bending of superposed sheets by heat-softening. The apparatus comprises generally a frame A, a feed bed B, a conveyor assembly C and an electrostatic dusting assembly D. The feed bed B comprises a series of disc-shaped rubber rollers 1 rotatably mounted on shafts 2 which are attached to the frame A. The rollers 1 are formed of a non-conductive material in order to prevent conduction of the electrostatic charge from the glass to the apparatus.

The conveyor assembly C comprises a wood slat conveyor 4 having two continuous chains 5 driven by sprockets 6 mounted on a common drive shaft 7. The chains 5 are guided by tracks 8 throughout their upper runs. At their ends opposite the sprocket 6, the chains 5 engage idler sprockets 9 attached to a shaft 10 which is rotatably mounted to the frame A.

Wood slats 11 attached to the chains 5 extend transversely across the conveyor 4 at uniformly spaced intervals. The slats 11 provide an insulated support for the glass during its passage through the dusting assembly D. The drive shaft 7 is driven by an electric motor 12 through a sprocket chain 13 that runs over a sprocket 14 attached to one end of the shaft 7.

The dusting assembly D comprises a dust chamber 15 mounted on the frame A through which the slat conveyor runs as shown in FIGURE 2, the chamber having an opening 17 at one end to receive the incoming glass sheets from the feed bed B and an exit opening 18 at its other end through which the glass conveyor 4 extends and through which dust may be blown into the chamber 15. Suitable dust supply hoppers 19 are provided adjacent the exit end of the chamber 15. The dust from the hoppers 19 is delivered into feed conduits 20 which extend across the conveyor 4 adjacent the exit opening 18. Compressed air at the desired pressure is delivered to the conduits 20 through suitable air valves 21 and the finely-divided dust is blown from the conduits 20 through the opening 18 into the chamber 15 by means of discharge nozzles 22 attached at spaced points to the conduits 20 as shown in FIGURE 1.

The conduits 20 may be vibrated during the dusting operation by suitable means such as electric vibrator motors 23 attached to the conduits 20 as indicated in FIGURE 1. As a further precaution, the compressed air may be introduced into the lines in pulses so as to provide better dispersion of the dust particles entering the dusting chamber. The valves 21 may be intermittently opened and closed by suitable means to create the pressure pulsations and the intermittent operation of the valve actuating means may be caused by means of a trip switch 24 that is actuated upon passage of each of the slats 11 to energize valve actuating solenoids.

As shown in FIGURE 2, an electrostatic charging electrode in the form of a screen 25 is suspended from a charge screen support bar 26, which extends transversely across the apparatus at the intake end of the dust chamber 15. The electrostatic charging screen 25 is connected to the output terminal of a high voltage direct current generator 27 in order to provide the desired negative charging potential.

Located below the electrostatic charge screen is a ground plate 28 mounted on a ground plate support bar 29.

The glass sheets on the conveyor pass through the electrical field between the suspended charging electrode 25 and the ground plate 28 as they pass into the dust chamber 15 and their top faces become negatively charged. Since the inductive capacity of the glass sheets is relatively high and the conveyor 4 provides an insulated support, a considerable portion of the charge is retained by the glass sheets during their passage through the dust chamber. The negative charge retained by the glass is sufficient to provide a charge differential between the glass and dust particles in the air passing over the glass sufficient to pull dust particles into contact with the glass and cause them to cling to the glass surface. Since all portions of the top surfaces of the glass sheets are equally charged, a very uniform distribution of the fine dehydrated particles is obtained and, if the glass sheets are taken from the conveyor 4 and stacked for placement on the bending molds the uniformity of the coatings will not be disturbed and any appreciable absorption of moisture by the dehydrated particles will be prevented.

An exhaust means is provided for removing excess dust from the dust chamber 15 and comprises an exhaust duct 30 located at the bottom of the exhaust chamber 15 and somewhat below the top surface of the glass conveyor assembly C. The exhaust duct 30 has an air passage 31 located at one side of the apparatus which is arranged to exhaust the air into the outside atmosphere. An exhaust fan 32 may be located in the exhaust passage as shown in FIGURE 1 to provide a more efficient exhausting of excess material.

In the practice of the method of the present invention, the sheets of glass which will form the laminated safety glass product are first prepared for bending. In some instances where the invention is practiced, the glass sheets will be cut to desired size prior to bending. This is not necessary, however, and uncut sheets may be used initially and cut to size after bending.

The two sheets are then passed through a dusting stage which may be performed by an apparatus such as that described above. During this stage, a finely divided, water-soluble "parting" material in dust form is applied to one or both pieces of glass. It has been found that dehydrated Epsom salts ($MgSO_4$) milled to a particle size of form 400 to 500 mesh is suitable for this purpose; however, other suitable water-soluble, high melting point materials may be used without departing from the spirit of the invention.

The two sheets of glass are then superposed with their dusted surfaces in contact. The superposed sheets are then placed on a bending mold such as that described in my United States Patent No. 2,872,756 and the mold is introduced into a bending lehr. Here the glass is heat-softened by temperatures which may range from 1160° to 1200° F. It is desirable that only a short time elapse between the dusting of the sheets and their stacking for placement on the bending molds in order to avoid absorption of moisture by the powdered material and to insure a uniform distribution of the powder between the sheets.

When the glass becomes sufficiently heat-softened, it loses its rigidity and sags into the mold contour to provide the desired form for the finished laminated glass product. During this bending operation, the finely-divided particles of "parting" material provide a means for "lubricating" the adjacent surfaces of the glass sheets and prevent fusion and binding of the glass surfaces and the resulting retardation of bending or even possible breakage.

Following the bending stage, the glass sheets are cooled and separated one from the other. The separated sheets are then passed through a washing stage where the water-soluble "parting" material is removed by high pressure sprays of water or other suitable solvent. The sheets are then dried and prepared for the laminating stage.

At the laminating stage, a sheet of thermosetting plastic material is placed between the sheets and the sheets assembled in the same relationship in which they were superposed during the bending stage. The laminated article is then heated in a vacuum to "set" the thermosetting plastic material and adhere the plastic to both sheets of glass.

The laminated product is then cooled and the process is completed.

It is to be understood that the above description is by way of illustration rather than limitation and that variations and modifications of the specific device herein shown and described may be made without departing from the spirit of the invention.

Having thus described my invention, I claim:

1. In a method of making bent laminated glass products by heat-softening two sheets of glass superposed on a bending mold, the steps of electrostatically charging a sheet of glass to be superposed for bending, dusting a surface of said charged sheet of glass with finely-divided, substantially moisture-free particles of a high melting point, water-soluble "parting" material, by passing a current of air in which said particles are suspended over said charged sheet, whereby said particles are electrically attracted to the surface of said sheet, and stacking said sheet with another sheet prior to heat-softening whereby said dusted surface faces said other sheet.

2. In a method of making bent laminated glass products by heat-softening two sheets of glass superposed on a bending mold, the steps of electrostatically charging a sheet of glass to be superposed for bending, dusting a surface of said charged sheet of glass with finely-divided, dehydrated particles of a high melting point, water-soluble salt by passing a current of air in which said particles are suspended over said charged sheet, whereby said particles are electrically attracted to the surface of said sheet and stacking said sheet with another sheet on a bending mold preparatory to heat-softening with said dusted surface facing said other sheet.

3. In a method of making bent laminated glass products by heat-softening two sheets of glass superposed on a bending mold, the steps of inducing an electrostatic charge on two sheets of glass to be superposed for bending, dusting a surface of each of said sheets of glass with finely-divided, dehydrated particles of a high melting point, water-soluble salt by passing a current of air in which said particles are suspended over said charged sheet whereby said particles are electrically attracted to the surface of said sheets and superposing said sheets on a bending mold preparatory to heat-softening with their dusted surfaces disposed face-to-face.

4. A method as defined in claim 3 wherein said particles of a high melting point, water-soluble salt have a size of from 400 to 500 mesh.

5. In a method of making bent laminated glass products by heat-softening two sheets of glass superposed on a bending mold, the steps of inducing an electrostatic charge on two sheets of glass to be superposed for bending, dusting a surface of each of said sheets of glass with finely-divided, dehydrated particles of magnesium sulfate whereby said particles are electrically attracted to the surface of said sheets, and superposing said sheets on a bending mold preparatory to heat softening with their dusted surfaces disposed face-to-face.

6. A method as defined in claim 5 wherein said particles of magnesium sulfate have a size of from 400 to 500 mesh.

References Cited

UNITED STATES PATENTS 2,486,153  10/1949  Gwyn _____ 65—24

DONALL H. SYLVESTER, *Primary Examiner.*

A. D. KELLOGG, *Assistant Examiner.*